Patented Feb. 27, 1951

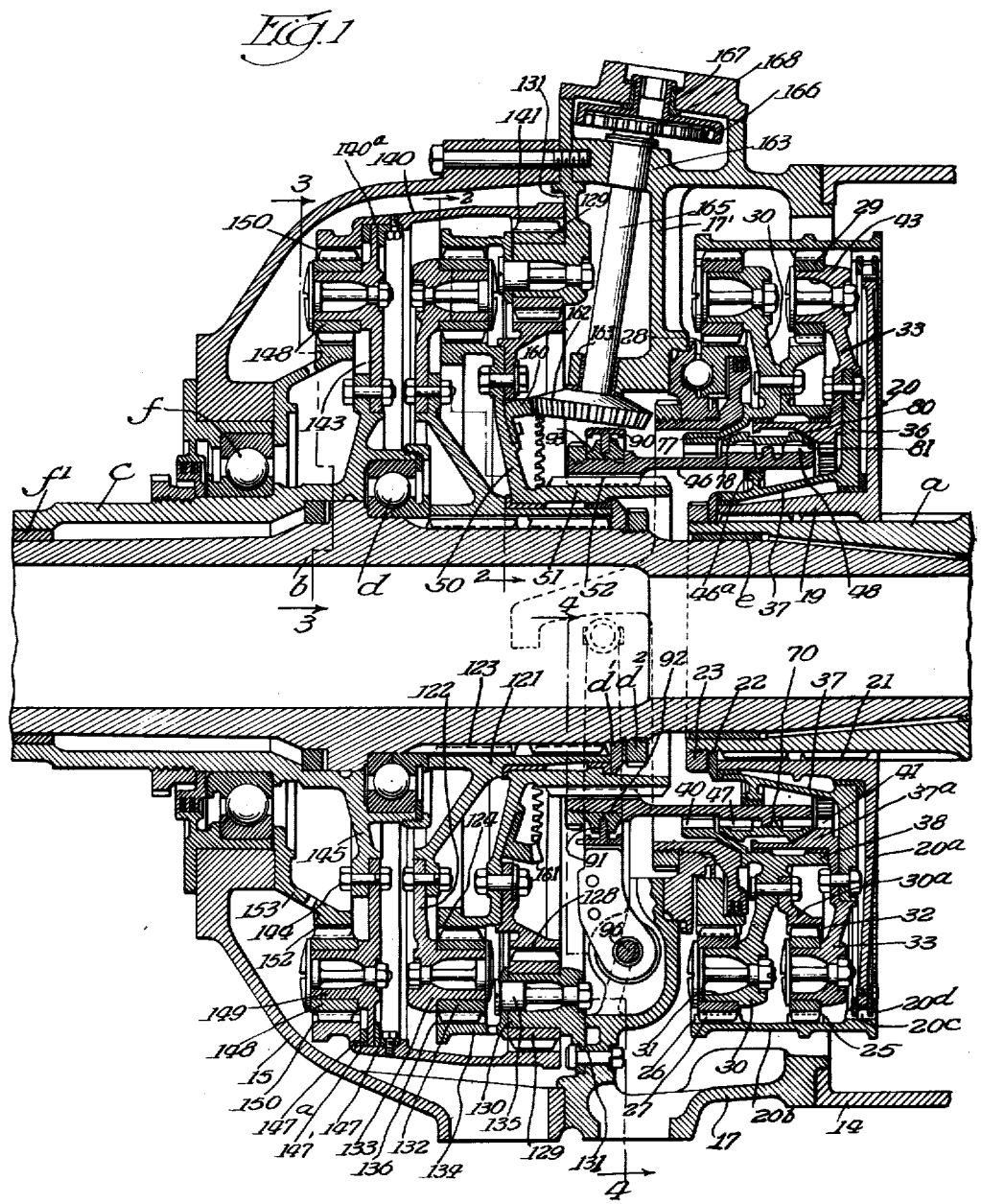

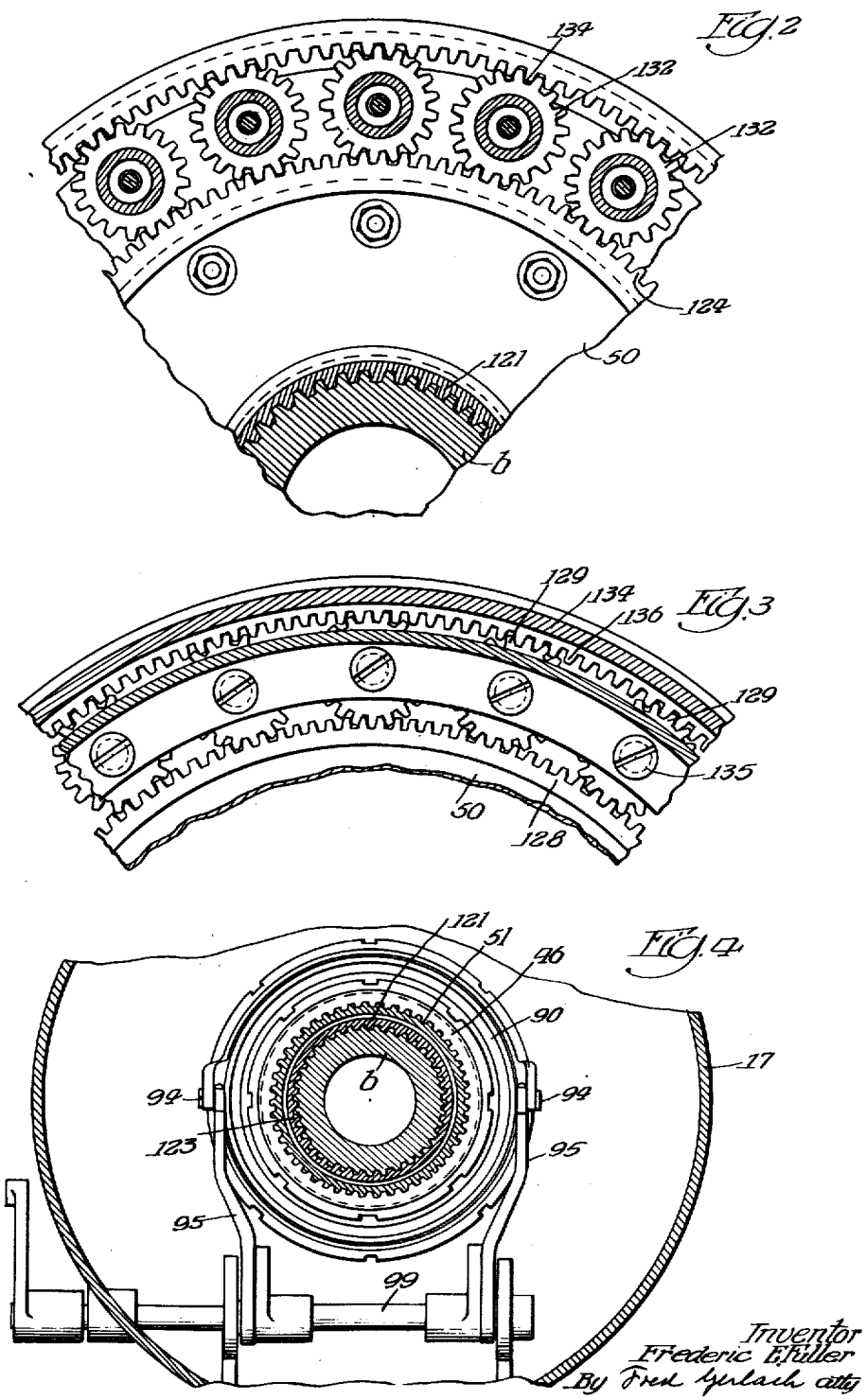

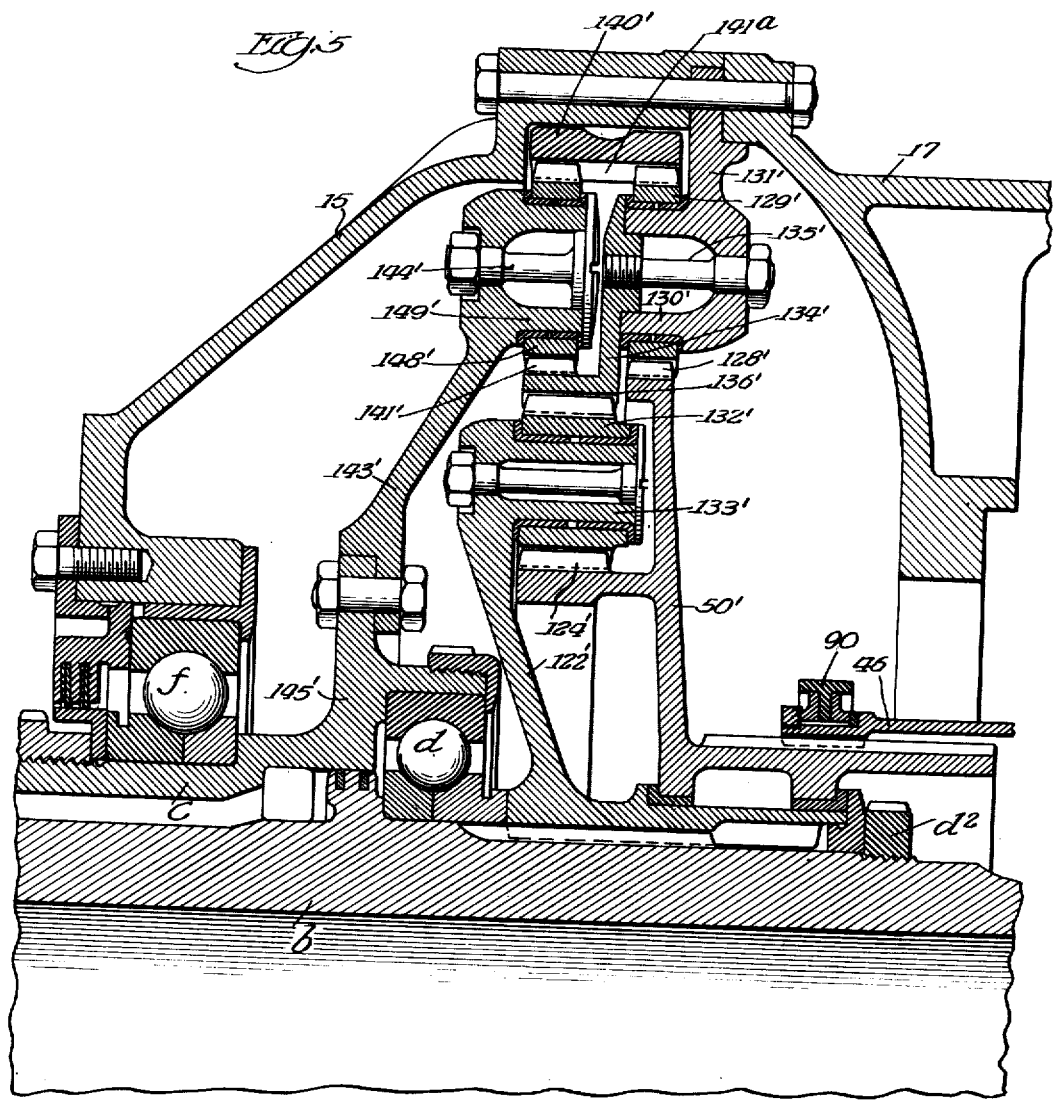

2,543,453

UNITED STATES PATENT OFFICE 2,543,453

MECHANISM FOR DRIVING CONTRA-ROTATING PROPELLERS

Frederic E. Fuller, Williamsport, Pa., assignor to Avco Manufacturing Corporation, a corporation of Delaware Application August 11, 1945, Serial No. 610,226

6 Claims. (Cl. 74—674)

The invention relates to mechanism for driving contra-rotating propellers.

One object of the invention is to provide improved mechanism for driving co-axial contra-rotating propellers which includes a power input-wheel which may be driven from variable speed reduction gearing and includes planetary gear sets and gearing for driving one gear set in the opposite direction from the other.

Another object of the invention is to provide mechanism of this type in which torques are produced by multiplicity of similar gear-tooth contacts.

Another object of the invention is to provide improved mechanism of this type in which the load transmitted to the two propellers is divided at the input gear.

Another object of the invention is to provide driving mechanism of this type which is radially symmetrical around the axes of the propeller shafts.

Another object of the invention is to provide driving mechanism of this type which is compact in construction, adapted for heavy driving loads, and comparatively light in weight.

Other objects of the invention will appear from the detailed description.

The invention consists in the several features hereinafter set forth and more particularly defined by claims at the conclusion hereof.

In the drawings:

Fig. 1 is a longitudinal section of driving mechanism embodying the invention.

Fig. 2 is a section taken on line 2—2 of Fig. 1.

Fig. 3 is a section taken on line 3—3 of Fig. 1.

Fig. 4 is a section taken on line 4—4 of Fig. 1.

Fig. 5 is a longitudinal section of a modified form of the invention.

The invention is exemplified in driving mechanism which comprises generally: two-speed planetary reduction gearing which is driven by power from the crank-shaft $a$ of an internal combustion engine; clutch-mechanism which is driven by the two-speed reduction gearing; and gearing driven by the clutch mechanism for driving the shaft $b$ of one propeller and the hollow shaft or sleeve $c$ of a contra-rotating propeller. This driving mechanism is enclosed in a gear-case which usually comprises a rear-section 14 which may be secured to the front of the engine-casing, a front-section 15, and an intermediate section 17. The propeller-shaft $b$ is journalled in an anti-friction bearing $d$ and in a bushing $e$ confined in a socket in the front of the crank-shaft $a$. The hollow shaft or sleeve $c$ for driving a co-axial second propeller is journalled in an anti-friction bearing $f$ mounted in the front gear-case section 15, and also on shaft $b$, by a bushing $f'$. Bearing $d$ is carried by the sleeve $c$.

The two-speed planetary reduction gearing for driving the propeller-shafts $b$ and $c$ from the crank-shaft $a$ of an internal combustion engine, at two speed ratios, comprises: a wheel, generally designated 20, which is provided with a hub 19 on the front end of crank-shaft $a$ and secured to rotate with said shaft by splines 21; a collar 22 and a nut 23 for securing wheel 20 against axial movement on the front end of crank-shaft $a$; an internally toothed gear 25 on wheel 20; an internally toothed gear 26 on wheel 20 and of the same pitch diameter as gear 25; an annular series of planetary pinions 27 meshing with gear 26; a sun-gear 28 meshing with planetary pinions 27 and which has its rotation limited by a torque-meter, as hereinafter described; an annular series of planetary pinions 29 meshing with gear 25; a low-speed carrier 30 which is provided with integral studs 31 on which planetary pinions 27 are journalled for rotation on their own axes; a sun-gear 32 of the same pitch diameter as the sun-gear 28, on a ring 30ª which is bolted to carrier 30, and meshing with the planetary pinions 29; a high-speed carrier 33 provided with forwardly projecting integral studs 43 on which planetary pinions 29 are journalled for rotation on their own axes and which includes a body-section 36 and a hub 37 which is journalled and axially confined on the forwardly extending hub 19 of wheel 20 for rotation of carrier 33 relatively to wheel 20; a hub 38 on carrier 30 which is journalled on the hub 37ª of carrier 33 for relative rotation.

The drive-wheel 20 comprises a body 20a which is integrally formed with the hub 19 and the internal gears 25 and 26 are integrally formed on a separately formed drum 20ᵇ. The body 20a and drum 20ᵇ are secured to rotate together by splines 20ᶜ which are interlocked against movement by spring-rings 20ᵈ. Gears 25 and 26 have the same pitch diameter, pinions 27 and 29 have the same pitch diameters, and sun-gears 28 and 32 have the same pitch diameter.

In this two-speed reduction gearing, the high and low speed carriers and the rotatable sun-gears are co-axial; the internal gears 25 and 26 on drive-wheel 20 rotate co-axially with the carriers and the planetary movement of the pinions is around the axes of the internal gears and the carriers. The high-speed carrier 33 is journalled on the hub of drive-wheel 20 and the low-speed carrier 30 is journalled on the hub 37ª of high-speed carrier 33. This arrangement provides a compact construction which is an advantageous mechanism for driving propellers.

A rotatable and axially slidable clutch-sleeve 46 is engageable with carrier 30 for driving the propeller at the low-speed ratio and with carrier 33 for driving it at the high-speed ratio. An internal peripheral portion of hub 38 of carrier 30 is provided with an integral annular series of clutch-teeth 40 which are engageable with mating clutch-teeth 47 on sleeve 46 for driving the sleeve and propellers at the low-speed ratio. An internal peripheral portion of hub 37ª of carrier 33 is provided with an annular series of clutch-teeth 41 which are engageable by a mating series of clutch-teeth 48 on clutch-sleeve 46 for driving said sleeve and the propellers at the high-speed ratio. The inner end of clutch-sleeve 46 is slidably supported and journalled for relative rotation, as at 46ª, on the hub 37 of section 38 of carrier 33. When clutch-teeth 47 on sleeve 48 are engaged by axial sliding movement of the sleeve with clutch-teeth 40 on carrier 30, said sleeve will be driven by the two-speed reduction gearing at the low-speed ratio. When sleeve 46 is shifted axially to engage its clutch-teeth 48 with clutch-teeth 41 on carrier 33, said sleeve will be driven by the two-speed reduction gearing at the high-speed ratio. When the clutch-sleeve 46 is axially positioned with its teeth 47 and 48 between clutch-teeth 40 and 41, said sleeve will be in its neutral position and uncoupled from the two-speed reduction gearing.

The sun-gear 28 is held against rotation relatively to the internally toothed gear 26 on drive-wheel 20, in co-action with gear 25, for imparting planetary movement to pinions 27 and driving the high speed carrier 33 and the low-speed carrier 30 under control of a torque-meter which is used to operate an indicator (not shown) for torque being delivered by the engine to the two-speed reduction gearing. This torque-meter may be of any construction known in the art.

Mechanism for axially shifting the clutch-sleeve 46 for controlling the speed ratio at which the propeller-shafts b and c are driven, is exemplified by a non-rotatable shifter-collar 90 which is provided with an inwardly extending flange 91 which is confined between an annular shoulder 92 and a collar 93 on, and for slidably shifting sleeve 46 while the latter is rotating; diametrically opposite pivot-studs 94 on collar 90; arms 95 having their distal ends pivotally connected to studs 94, and a torque-rod 99 extending through and secured to arms 95. The torque-rod 99 may be connected in any suitable manner for remote control, usually by a hydraulic piston and cylinder which are adapted to provide torque for rocking arms 95 to shift clutch-sleeve 46 between its high-speed and low-speed driving positions.

A balk-ring 70 extends around the clutch-teeth 47 and 48 on clutch-sleeve 46 for restraining the engagement of clutch-teeth 47 on sleeve 46 with clutch-teeth 40 on the low-speed carrier 30 and engaging clutch-teeth 48 on sleeve 46 with clutch-teeth 41 on the high-speed carrier 33, until the carriers, respectively, and the clutch-sleeve are rotating substantially at synchronous speeds. This balk-ring has limited rotation on clutch-sleeve 46 and is provided with a conical friction-face 76 engageable with a mating friction-face 77 on the low-speed carrier 30 and with a conical friction-face 81 engageable with a mating friction-face 80 on the high-speed carrier 33 for controlling the balk-ring through teeth on the balk-ring and abutments on sleeve 46. The construction and operation of the balk-ring are disclosed in patent to Gilliard, No. 2,403,594, dated July 9, 1946.

The mechanism for driving both the propeller-shaft b and sleeve c for driving the co-axial contra-rotating propellers is driven from clutch-sleeve 46, which is selectively operable at the high and low speed ratios as before described. A planetary pinion carrier 122 comprises a hub-section 121 which is splined, as at 123, to the propeller-shaft b. The hub-section 121 is locked against endwise movement on shaft b between bearing d and a collar d' by a nut d². A sun-wheel 50 is provided with a hub 51 which is journalled, and secured against axial movement by collar d', on the hub-section 121 of carrier 122. Clutch-sleeve 46 is slidably splined, as at 52, to the outer periphery of hub 51 of sun-wheel 50. Sun-wheel 50 is provided with an integral externally toothed sun-gear 124. An annular series of planetary gears 132 are journalled for rotation on stud-shafts 133 which are integral with and extend rearwardly from the carrier 122 and mesh with the sun-gear 124 on wheel 50. A ring 134 is fixedly secured, by bolts 135 which extend through stud-shafts 130 and a ring 131 which is fixedly secured in the casing-section 17, and is provided with a toothed internal gear 136 which meshes with the outer portions of the gears 132.

Propeller-shaft b is driven from clutch-sleeve 46 which is driven by the two-speed planetary reduction gearing, by wheel 50 which is splined to and driven by clutch-sleeve 46; sun-gear 124 on wheel 50, the planetary movement of pinions 132 produced by their engagement with the stationary internal gear 136 on stationarily supported ring 134, and the rotation imparted to carrier 122 by the planetary movement of pinions 132. Carrier 122 rotates in the same direction as and is driven at a lower speed than the wheel 50 and sleeve 46.

Propeller driving-sleeve c is also driven from the clutch-driven wheel 50 by an externally toothed gear 128 which is secured by bolts to wheel 50 which is splined to sleeve 46. An annular series of pinions 129 are journalled on stud-shafts 130 which are integrally formed with ring 131 which is secured in casing-section 17. The sleeve c which drives one propeller is provided with an annular flange 145 to which is secured by bolts 144, a planetary pinion carrier 143. An annular series of planetary pinions 148 are journalled on stud-shafts 149 which are integral with and extend forwardly from the carrier 143. A drum 140 is located endwise as at 140a on the rim of carrier 143 and is provided with an integral internally toothed gear 141 which meshes with the outer portions of pinions 129 which rotate on stationary stud-shafts 130 and is also provided, at its forward end, with an integral toothed internal gear 150 which meshes with the outer portions of pinions 148 which are journalled for rotation on their own axes on stud-shafts 149. A ring 153 is stationarily secured in the front gear-case section 15 and is provided with an integral externally toothed gear 152 which meshes with the inner portions of planetary pinions 148. Drum 140 is supported on carrier 143 against endwise movement between a bushing 147' axially located by a shoulder 147ª in drum 140, and by a collar 147. Pinions 129 are rotated on stationary studs 130 by gear 128 and impart rotation to the drum 140 and the internal gear 141 and the internal gear 150 thereon. Internal gear 150, in co-action with the external gear 152, imparts planetary movement to pinions 148 which impart rotation to carrier 143 which is fixed to and drives sleeve c in the opposite direction from which carrier 122 and propeller-shaft b are driven. The pitch diameter of gear 128 is greater than the pitch diameter of sun-gear 124. The relative pitch diameters of gear 141 and 150 on drum 140 and the pitch diameter of non-rotatable gear 152 are proportioned to drive the carrier 143 and sleeve c at the same speed as the shaft b so that the propellers will be rotated from wheel 50 at the same speed and in opposite directions. This gearing drives shaft b and sleeve c and the propellers at a reduced speed relatively to the clutch-sleeve 46, thus effecting a gear reduction from sleeve 46, which is driven by the two-speed planetary gearing.

In the construction described, carrier 122, planetary gears 132, gear 124 on the driven-wheel 50, and the internally toothed gear-ring 134 constitute a planetary gear-set for driving the propeller-shaft b; carrier 143, planetary pinions 148, gear 152 and gear 150 on drum 140 constitute a planetary gear-set for driving the propeller-sleeve c; and gear 128 on wheel 50, pinions 129 which rotate on stationary axes and internal gear 141 constitute gear-means for reversing the rotation of the carrier 143 which drives sleeve c relatively to the direction of rotation of wheel 50 and carrier 122 which drives the propeller-shaft b.

The operation of the mechanism for driving the contra-rotating propellers will be as follows: clutch-sleeve 46 may be selectively driven at high or low speed ratios and at a reduced speed relatively to the engine-shaft a by shifting clutch-sleeve 46 which is splined and axially slidable on the hub of wheel 50. Axial shift of clutch-sleeve 46 into its forward position will engage its clutch-teeth 47 and clutch-teeth 40 on the low-speed carrier 30 and drive the propellers at the low-speed ratio. Rearward axial shift of clutch-sleeve 46 will mesh its clutch-teeth 48 and the clutch-teeth 41 on the high-speed carrier 33 and drive sleeve 46 to drive the propellers at the high-speed ratio. Clutch-sleeve 46 will drive the driven-wheel 50 from the two-speed gearing in one direction. The planetary gear-set comprising gear 124 on wheel 50, pinions 132, carrier 122 which is splined to shaft b, and internal gear 136 will drive shaft b in the same direction as and at a reduced speed relatively to clutch-sleeve 46 and wheel 50. The planetary gear-set comprising carrier 143 fixed to sleeve c, planetary pinions 148, non-rotatable gear 152 and gear 150 on drum 140 will drive carrier 143 and sleeve c in the opposite direction and at the same speed as carrier 122, by the gear 128 on wheel 50, pinions 129 and gear 141 on drum 140.

In practice, it is desirable to include with the driving mechanism gearing for the propellers, gearing for driving the torque meter oil pump (not shown) and for the propeller governor. For this purpose, a ring 160 is fixedly secured to wheel 50 and provided with a bevel gear 161. A gear 162 on a shaft 165 meshes with gear 161. Shaft 165 is journalled in bearings 163 which are secured to or integrally formed with the wall 17′ in section 17 of the gear-case. A gear 166 on the upper end of shaft 165 meshes with and drives an internal gear 166 on a stud-shaft 167 which is connected to drive the pump.

A modified construction is illustrated in Fig. 5 in which the planetary gear-sets for driving shaft b and sleeve c, respectively, and the gear-means for reversing the direction of the planetary gear-set for said sleeve relatively to said shaft, are compactly arranged. The planetary gear-set for driving shaft b comprises an external gear 124′ on wheel 50′ which is driven by and splined to the clutch-sleeve 46; a carrier 122′ which has its hub splined to shaft b and is provided with a series of rearwardly extending stud-shafts 133′; a series of planetary pinions 132′ journalled on stud-shafts 133′; a stationary internal gear 136′ on a ring 134′ which is fixedly secured in the gear-casing. The planetary gear-set for driving sleeve c comprises a planetary pinion-carrier 143′ which is secured to a flange 145′ on the hub of sleeve c; planetary pinions 148′ journalled on rearwardly extending stud-shafts 149′ on carrier 143′, the inner portion of which mesh with an external gear 141′ on stationary ring 134′; a series of pinions 129′ journalled on stud-shafts 130′ on a ring 131′ which is fixedly secured between the sections 15 and 17 of the gear-case; an external gear 128′ on wheel 50′ which meshes with pinions 129′; and a ring or drum 140′ which is provided with an internal gear 141ᵃ which meshes with pinions 129′ and 148′. The ring 140′ is confined against endwise movement by the gear-case and is supported by pinions 148′ and 129′. In this modification, the gear 128′, pinions 129′ and drum 140′ cause the carrier 143′ to be driven in the direction opposite to the direction in which carrier 122′ is driven. The ring 134′ is secured by bolts 135′ which extend through stud-shafts 130′ to ring 131′. Pinions 148′ are held on stud-shafts 149′ by bolts 144′ which extend through said shafts. In the constructions described for contra-rotationally driving the propellers, both planetary gear-sets and the gearing for reversing one relatively to the other are symmetrically arranged around the axis of the shaft b and sleeve c. The planetary gear-sets are arranged in close relation and the reversing gear-means are compactly arranged longitudinally. The drive-wheel 50′ is journalled on the hub of carrier 122′. Carrier 122′ rotates in the same direction as and at a reduced speed relatively to the wheel 50′.

The operation of this form of the invention will be as follows: wheel 50′ will be selectively driven by clutch-sleeve 46 at the high and low speed ratios of the two-speed planetary gearing. Gear 124′ on wheel 50′, in co-action with stationary internal gear 136′, will impart planetary movement to pinions 132′, which will impart rotation to carrier 122′ and drive shaft b. Gear 128′ on wheel 50′ will drive pinions 129′ which are journalled on fixed axes. Pinions 129′ meshing with gear 141ᵃ will rotate ring 140′ in the gear-case. Ring 140′, in co-action with gear 141′ on stationary ring 134′, will impart planetary movement to pinions 148′ which will impart rotation to carrier 143′ and sleeve c in the opposite direction from which shaft b is driven. In this modification, the gear-sets are arranged in close relation which is advantageous in driving contra-rotating propellers.

The invention exemplifies mechanism for driving contra-rotating propellers from a single input element, such as a clutch-sleeve, which is adapted to be driven by two-speed reduction gearing in which planetary gear-sets are used for reducing the speed from the clutch-sleeve and gear-means drives the carrier of one planetary gear-set in the opposite direction and at the same speed as the carrier of the other is driven. The gearing is symmetrically disposed around the axis of the shaft and sleeve for driving the propellers; the torque is produced by a multiplicity of similar gear-toothed contacts; the gearing is radially symmetrical, is compact in construction and adapted for driving heavy loads.

The invention is not to be understood as limited to the details described, since these may be modified within the scope of the appended claims without departing from the spirit and scope of the invention.

Having thus described the invention, what I claim as new and desire to secure by Letters Patent is:

1. Mechanism for contra-rotationally driving propellers on a coaxial shaft and sleeve, respectively, comprising: a driven wheel coaxial with and rotatable relatively to the shaft and provided with two externally toothed gears; a planetary gear-set for driving the shaft from one of the gears on said driven wheel; a second planetary gear-set for driving the sleeve from the other gear on the driven wheel including a stationary gear, a planetary pinion-carrier on said sleeve and planetary pinions on said carrier on the sleeve and meshing with the stationary gear; gears mounted on stationary axes meshing with the second gear on the driven wheel; and a rotatable drum supported on the carrier on the sleeve, provided with internal gears meshing with the gears on stationary axes and the planet pinions on the planetary carrier on the sleeve, respectively.

2. Mechanism for contra-rotationally driving propellers on a coaxial shaft and sleeve, respectively, comprising: a driven wheel coaxial with and rotatable relatively to the shaft and provided with two externally toothed gears; a planetary gear-set for driving the shaft from one of the gears on said driven wheel; a second planetary gear-set for driving the sleeve from the other gear on the driven wheel including a stationary gear, a planet pinion carrier on said sleeve and planetary pinions on the carrier on the sleeve and meshing with the stationary gear; gears mounted on stationary axes meshing with the second gear on the driven wheel, a rotatable drum provided with internal gears meshing with the gears on the fixed axes and the planet pinions on the second planetary carrier on the sleeve, the carrier on the sleeve having a rim extended to fit in the drum and means on the drum engaging said rim for holding the drum against axial movement.

3. Mechanism for contra-rotationally driving propellers on a coaxial shaft and sleeve, respectively, comprising: a driven wheel coaxial with and rotatable relatively to the shaft provided with a hub and an outwardly extending body-forming flange and an externally toothed gear integral therewith; a ring separably fixed to one side of said body and provided with an externally toothed gear; a planetary gear-set for driving the shaft from the gear integral with the driven wheel including a hub keyed to the shaft and an outwardly extending flange, an annular planet pinion-carrier separably secured to one side of said last-named flange, planetary pinions journalled on said annular carrier and meshing with the gear integral with the driven wheel and a stationary internally toothed ring meshing with said planetary pinions; a second planetary gear-set for driving the sleeve from the gear ring secured to the driven wheel including a planet pinion carrier fixed on the sleeve and planetary pinions on the carrier on the sleeve; gears mounted on fixed axes and meshing with the gear-ring on the driven wheel; and a drum provided with internal gears meshing with the gears mounted on stationary axes and the planetary pinions on the carrier on the sleeve.

4. Mechanism for contra-rotationally driving propellers on a coaxial shaft and sleeve, respectively, comprising: a driven wheel coaxial with and rotatable relatively to the shaft provided with a hub and an outwardly extending body-forming flange and an externally toothed gear integral therewith; a ring separably fixed to one side of said body and provided with an externally toothed gear; a planetary gear-set for driving the shaft from the gear integral with the driven wheel including a hub keyed to the shaft and an outwardly extending flange, an annular planet pinion-carrier separably secured to said last-named flange, planetary pinions journalled on said annular carrier and meshing with the gear integral with the driven wheel and a stationary internally toothed ring meshing with said planetary pinions; a second planetary gear-set for driving the sleeve from the gear-ring secured to the driven wheel including a planet pinion carrier fixed on the sleeve, planetary pinions on the carrier on the sleeve, a stationary externally toothed gear meshing with the planetary pinions on the carrier on the sleeve; gears mounted on fixed axes and meshing with the gear-ring on the driven wheel; and a drum provided with internal gears meshing with the gears mounted on stationary axes and the planetory pinions on the carrier on the sleeve.

5. Mechanism for contra-rotationally driving propellers on a coaxial shaft and sleeve, respectively, comprising: a casing, a driven wheel coaxial with and rotatable relatively to the shaft provided with a hub and an outwardly extending body-forming flange and an externally toothed gear integral therewith; a ring separably fixed to one side of said body and provided with an externally toothed gear; a planetary gear-set for driving the shaft from the gear integral with the driven wheel including a hub keyed to the shaft and an outwardly extending flange, an annular planet pinion-carrier separably secured to said last-named flange, planetary pinions journalled on said annular carrier and meshing with the gear integral with the driven wheel and a stationary internally toothed ring meshing with said planetary pinions; a second planetary gear-set for driving the sleeve from the gear-ring secured to the driven wheel including a planet pinion-carrier on the sleeve, a stationary externally toothed gear separably secured to the casing and meshing with the planetary pinions on the carrier on the sleeve; gears mounted in the casing on the fixed axes and meshing with the gear-ring on the driven wheel; and a drum provided with internal gears meshing with the gears mounted on stationary axes and the planetary pinions on the carrier on the sleeve.

6. Reduction gearing for driving contra-rotating shafts comprising a casing surrounding the gearing, a shaft and a sleeve coaxially positioned relative to the shaft for contra-rotation by the gearing, a driven gear coaxially positioned relative to said shaft, said driven gear having gear teeth on its periphery, a planetary gear carrier secured to said shaft, planetary gears rotatably secured to said carrier and in mesh with the teeth of said driven gear, a stationary ring surrounding and meshed with said planetary gears, said ring gear being secured to the rear portion of said casing, a plurality of pinions rotatably secured to the rear portion of said casing for rotation about fixed axes, said last named pinions being in mesh with the teeth of said driven gear, a rotatable drum formed to define teeth on its interior, said drum surrounding said last mentioned pinions and having its gear teeth in mesh therewith, a pinion carrier on said sleeve, planetary pinions rotatably secured to said sleeve carrier, a stationary gear secured to the forward portion of said casing and in mesh with said planetary gears on said sleeve carrier, said drum also being in mesh with the teeth of said planetary pinions on said sleeve carrier and means for supporting said drum for rotation exclusive of said planetary gears and said planetary pinions.

FREDERIC E. FULLER.

REFERENCES CITED

The following references are of record in the file of this patent:

UNITED STATES PATENTS

| Number | Name | Date |
| --- | --- | --- |
| 1,654,432 | Rowledge | Dec. 27, 1927 |
| 2,228,638 | Mercier | Jan. 14, 1941 |
| 2,401,365 | Mercier | June 4, 1946 |
| 2,403,594 | Gilliard | July 9, 1946 |

FOREIGN PATENTS

| Number | Country | Date |
| --- | --- | --- |
| 9,413A | Great Britain | Apr. 23, 1907 |
| 541,820 | Great Britain | Dec. 12, 1941 |
| 847,990 | France | Oct. 19, 1939 |